US006915956B2

(12) United States Patent
Liu et al.

(10) Patent No.: US 6,915,956 B2
(45) Date of Patent: Jul. 12, 2005

(54) UNIVERSAL FLASH MEMORY CARD BANK STRUCTURE

(75) Inventors: Wen-Tsung Liu, Taipei Hsien (TW); Chia-Li Chen, Taipei Hsien (TW)

(73) Assignee: Carry Computer Eng. Co., Ltd., Hsin Tien (TW)

(*) Notice: Subject to any disclaimer, the term of this patent is extended or adjusted under 35 U.S.C. 154(b) by 0 days.

(21) Appl. No.: 10/216,613

(22) Filed: Aug. 12, 2002

(65) Prior Publication Data

US 2004/0056094 A1 Mar. 25, 2004

(51) Int. Cl.[7] .................................... G06K 19/06

(52) U.S. Cl. ...................... 235/492; 235/487; 235/441; 235/475; 439/630

(58) Field of Search ................................ 235/492, 487, 235/441, 451, 475; 361/736, 737, 741, 752; 439/502, 630

(56) References Cited

U.S. PATENT DOCUMENTS 5,184,282 A * 2/1993 Kaneda et al. .............. 361/737
5,540,601 A * 7/1996 Botchek ..................... 439/502
5,752,857 A * 5/1998 Knights ...................... 439/638
5,936,222 A * 8/1999 Korsunsky et al. ......... 235/441
6,097,605 A * 8/2000 Klatt et al. ................. 361/737
6,134,114 A * 10/2000 Ungermann et al. ........ 361/737
6,217,350 B1 * 4/2001 Johnson et al. ............ 439/131
6,386,920 B1 * 5/2002 Sun ........................... 439/630
6,438,638 B1 * 8/2002 Jones et al. ................ 710/301
6,570,772 B2 * 5/2003 Kawano et al. ............ 361/752
6,612,492 B1 * 9/2003 Yen ........................... 235/451

* cited by examiner

*Primary Examiner*—Steven S. Paik
(74) *Attorney, Agent, or Firm*—Thomas, Kayden, Horstemeyer & Risley

(57) ABSTRACT

This invention provides a universal flash memory card bank structure that can host various memory cards, comprising of an adaptor bank, a chassis, a top plate, and a bottom plate. The adaptors in the adaptor bank have sockets to host different memory cards. The adaptor bank is fixed on the chassis, and the sockets of it face against corresponding holes in the front of the chassis. The chassis with the adaptor bank is enclosed under the top plate and the bottom plate.

8 Claims, 7 Drawing Sheets

2 221 21 23 24 21 24 22 24 24 211 31 31 32 31 3 31 33 32

UNIVERSAL FLASH MEMORY CARD BANK STRUCTURE

BACKGROUND OF THE INVENTION

1. Field of the Invention

The present invention is related to a universal flash memory card bank structure, and particularly to a flash memory card bank that offers memory cards with different types and sizes such as Multi Media Card, Smart Media Card, SD Card and Memory Stick Card to communicate with a read and write device such that the memory cards can be inserted into the single read and write device to enhance the effect thereof.

2. Description of Related Art

With the rapid development of computer technologies, data storage and access has been the focus of all computer users. However, conventional memory cards (Multi Media Cards, Smart Media Cards, SD Cards, and Memory Stick Cards) have no improvement for long either in their structures or functions. It is urgent tasks to enhance the effect and reliability of flash memory cards.

SUMMARY OF THE INVENTION

In consideration of above situation, a universal flash memory card bank structure according to the present invention comprises an adaptor bank, a chassis, a top plate, and a bottom plate. Adaptors in the adaptor bank have sockets to host different memory cards. The adaptor bank is fixed on the chassis, and the sockets face against corresponding holes in the front of the chassis. The chassis and the adaptor bank are enclosed by the top plate and the bottom plate. This invention can support various memory cards while take less space. It not only brings convenience to users, but also decreases the cost for consumers.

The universal flash memory card bank of this invention possesses the following functionalities and features:

1. The flash memory card bank can host various memory cards (Multi Media Cards, Smart Media Cards, SD Cards, and Memory Stick Cards) under the help of its adaptor bank.
2. The flash memory card bank can ensure the correctness and reliability of application of memory cards, with the help of its halt-proof and fixing devices.
3. The flash memory card bank can avoid the short circuit result from contact between terminals in adaptors and top/bottom plates to minimize faults, with the help of its insulation layer between the interior of the device and top/bottom plates.

BRIEF DESCRIPTION OF THE DRAWINGS

The detail structure, the applied principle, the function and the effectiveness of the present invention can be more fully understood by reference to the following description and accompanying drawings, in which:

FIG. 2*a* is an exploded perspective view of another embodiment of the invention;

DETAILED DESCRIPTION OF THE PREFERRED EMBODIMENT

The functions and features of this invention is further detailed in the following illustrations and description.

Figure 1:
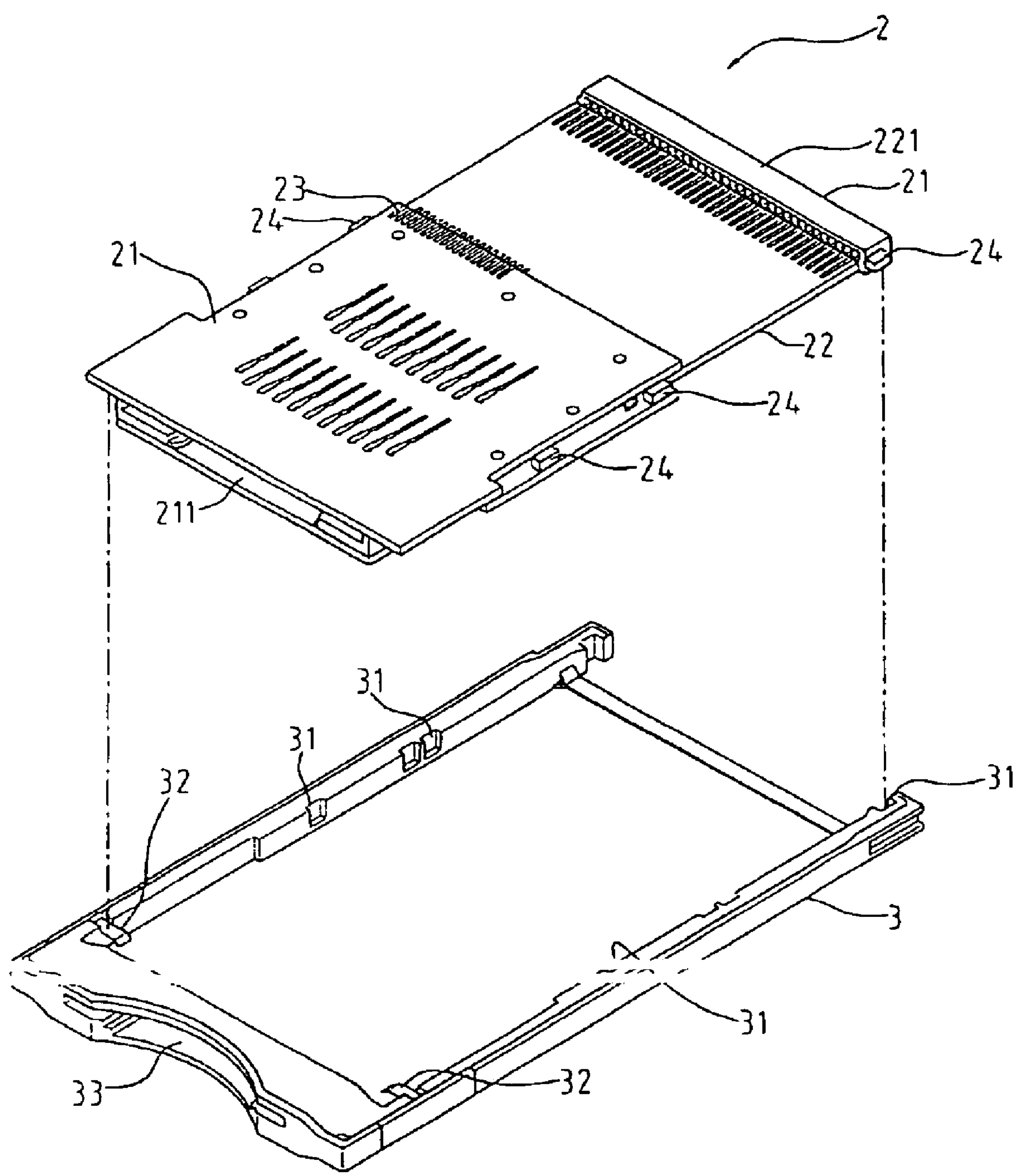
FIG. 1 is an exploded perspective view of an adaptor bank and a chassis according to the invention.

Referring to FIG. 1, an exploded perspective view of the adapter bank and the chassis of an embodiment implemented according to this invention. From the figure, we can see that an adapter bank (2) mainly comprises of an adapter (21) and a base plate (22). The adapter (21) connects to the base plate (22) via the terminals (23), through which the data can be transferred from the adapter (21) to the base plate (22). And the base plate (22) in turn sent the data to the system through its output terminals (221). The coupling between the adapter bank (2) and the chassis (3) is implemented with the clamping between the blocks (24) at the both sides of the adapter bank and the grooves (31) at the inner sides of the chassis (3) as well as the connection between the chassis (3) and the adapter bank (2) with a fastener (32). When the adapter bank (2) is fixed on the chassis (3), the socket (211) in the adapter (21) will face against the hole (33) of the chassis (3), thus the memory card (5) can be inserted and fixed in the socket (211) in adapter (21) through the hole (33) of the chassis (3).

Figure 2:
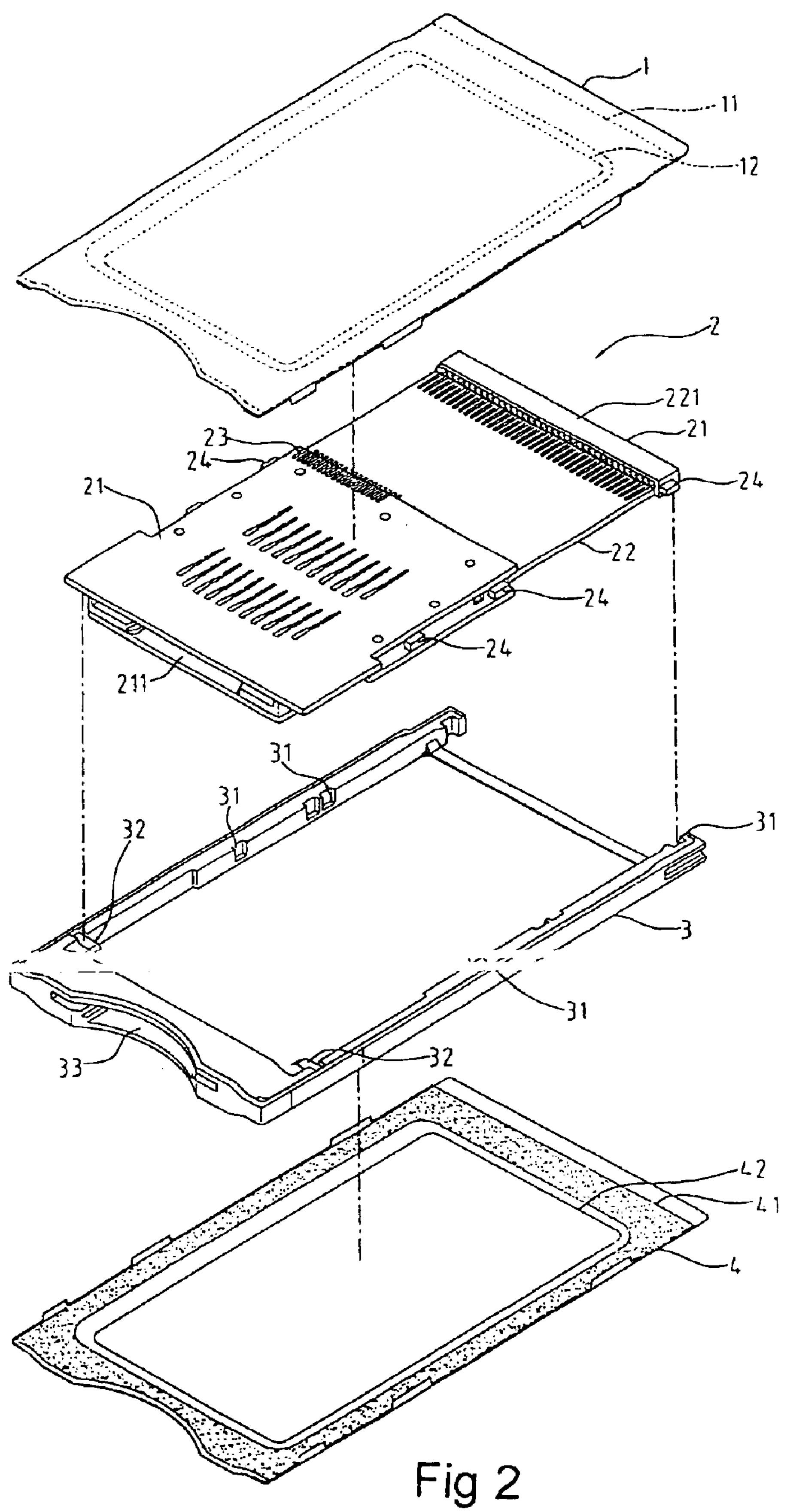
FIG. 2 is an exploded perspective view of an embodiment of the invention.
Figure 2:
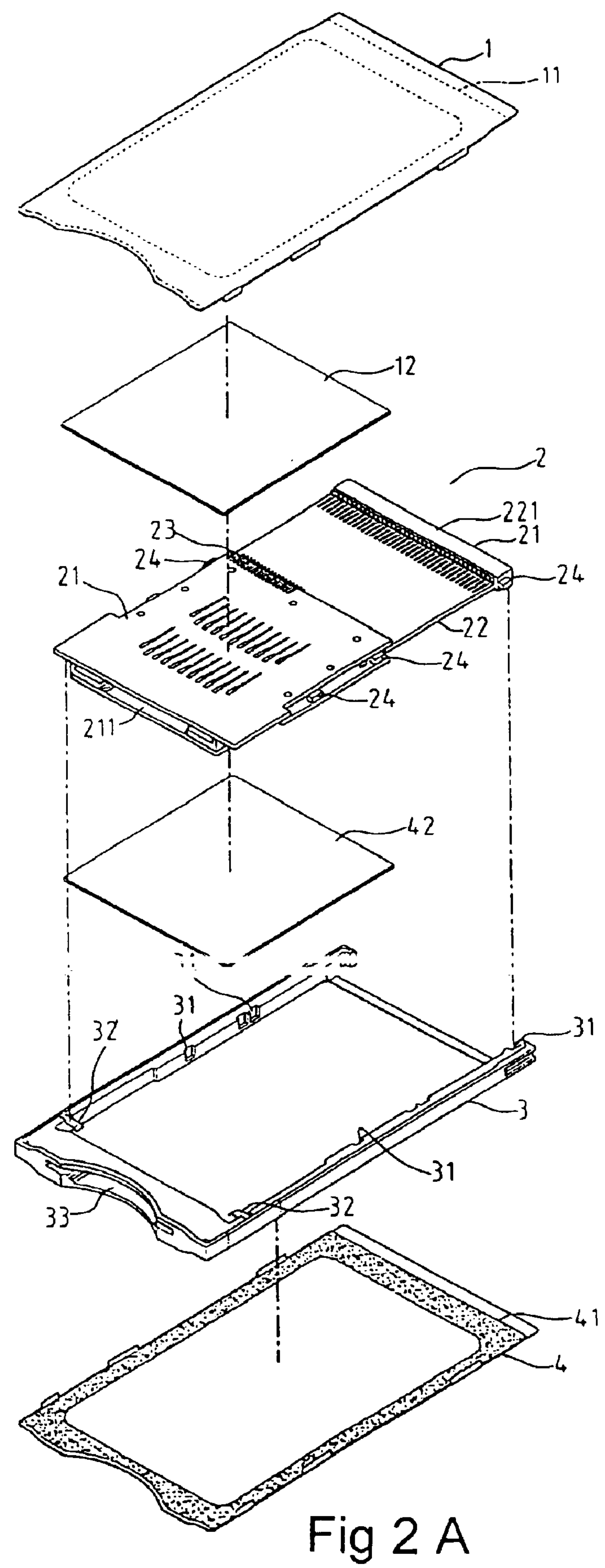

Please see FIG. 2, a 3D exploded view of an embodiment of this invention. From the figure we can see: The universal flash memory card bank comprises an adapter bank (2), a chassis (3), a top plate (1), and a bottom plate (4). The adapter bank is located in the chassis (3), and the entire device is enclosed in the top plate (1) and the bottom plate (4). The top plate (1) and the bottom plate (4) are fixed firmly on top/bottom side of the chassis (3) with the top adhesive plate (11) and the bottom adhesive plate (41), both of which are applied onto the top plate (1) and the bottom plate (4) respectively in advance. At assembly, the top plate (1), the bottom plate (4), and chassis (2) are heated together to form a whole structure. Any short circuit due to potential contact between terminals (215) of the adapter (21) and the top plate (1)/bottom plate (4) can be avoided by application of top insulation plate (12) and bottom insulation plate (42), both of which can be applied at the center of the top plate (1)/bottom plate (4) or at the outskirt of the top seat (212)/bottom seat (214). (shown in FIG. 1)

Figure 3:
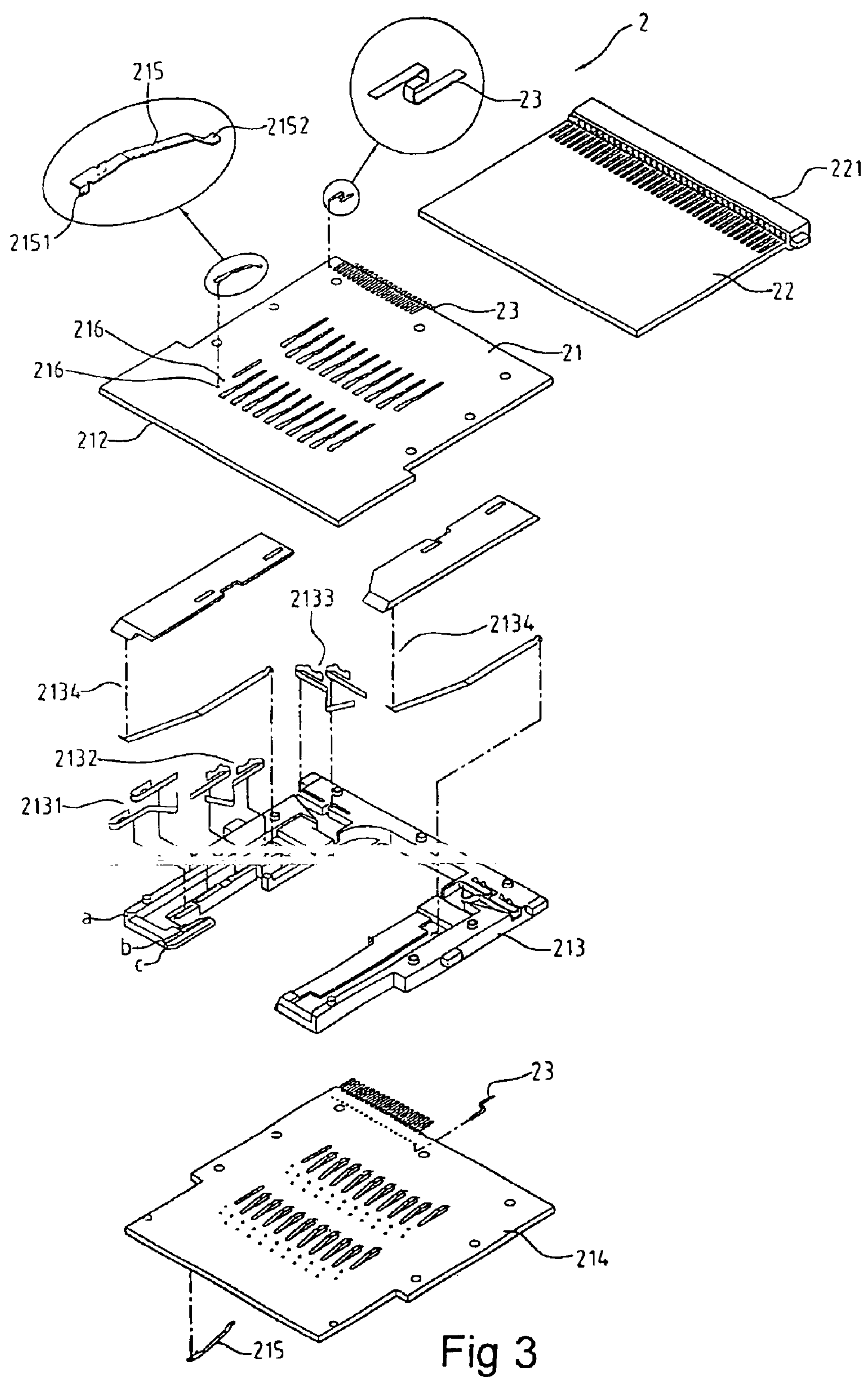
FIG. 3 is an exploded perspective view of the adaptor.

Referring to FIG. 3, an exploded perspective view of the adapter of the invention. As shown in the figure, the adapter (21) comprises a top seat (212), a bracket (213), and a bottom seat (214). The bracket (213) is a U-shaped structure with a socket (211) capable of accommodating various memory cards (5). The socket (211) provides several slots (a, b, c) for different flash memory cards (5). When the seat (213) is fixed together with the top seat (212) and the bottom seat (214), the socket (211) with slots (a, b, c) thereof forms an enclosed structure and opens at one side thereof so as to receive various memory cards (5). There are multi terminals (215) welded to a side of the bracket (213) to contact with the pins of adapter (21). The contact between the terminals (215) and the top seat (212)/bottom seat (214) is implemented by inserting and welding the two poles (2151) of the terminals (215) in the holes (216) of the top seat (212) and the bottom seat (214) respectively and then making the contact ends (2152) of the terminals (215) entering the bracket (213). In this way, the engagement of the pole (2151)

and hole (216) can not only fix terminals (215) firmly onto the top seat (212) or the bottom seat (214) but also avoid the deflection of contact ends (2152) of terminals (215) in the bracket (213). There are several sets of sensors (2133, 2131, 2132) for Smart Media Card, Multi Media Card, SD Card and Memory Stick Card in the adapter. These sensors can verify the connection between slots (a), (b), (c) and inserted flash memory cards (5) corresponding to the slots. Another set of sensors (2134) can be added on the slot (a) for Smart Media Cards. Terminal (23) are used to connect the top seat (212) to the bottom seat (214) as well as connect top seat (212)/bottom seats (214) to the base plate (22).

Figure 4:
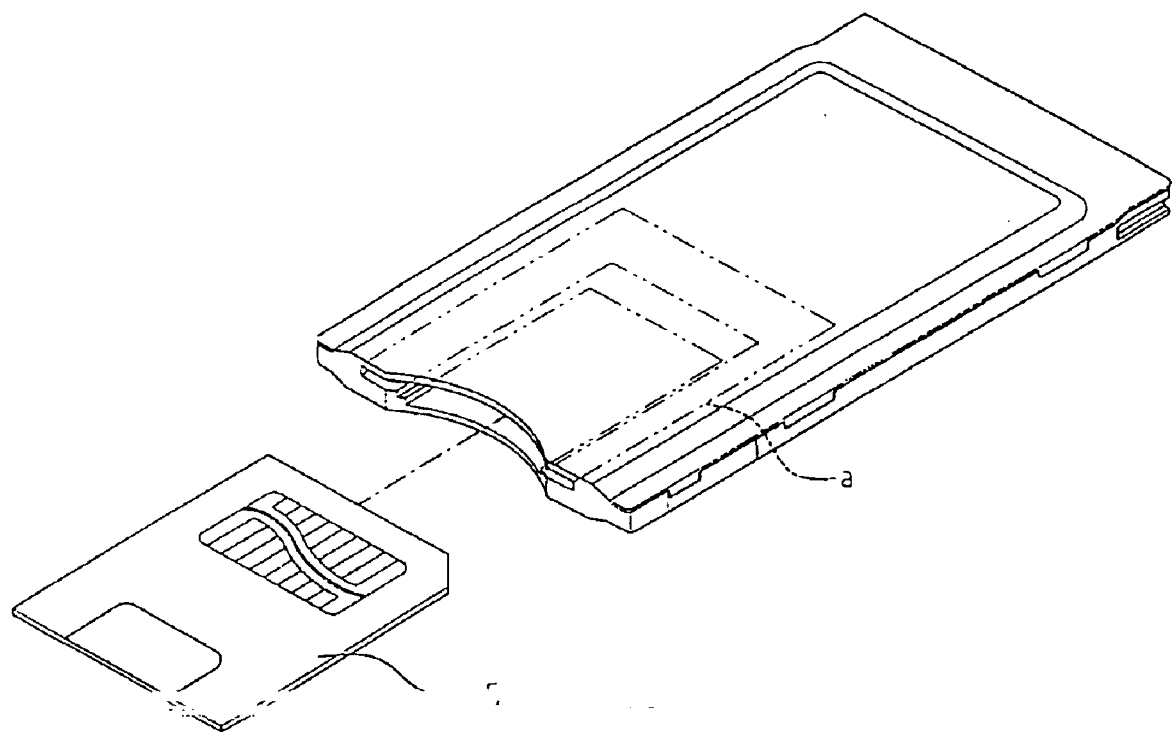
FIG. 4 is a perspective view of an embodiment of the invention.
Figure 5:
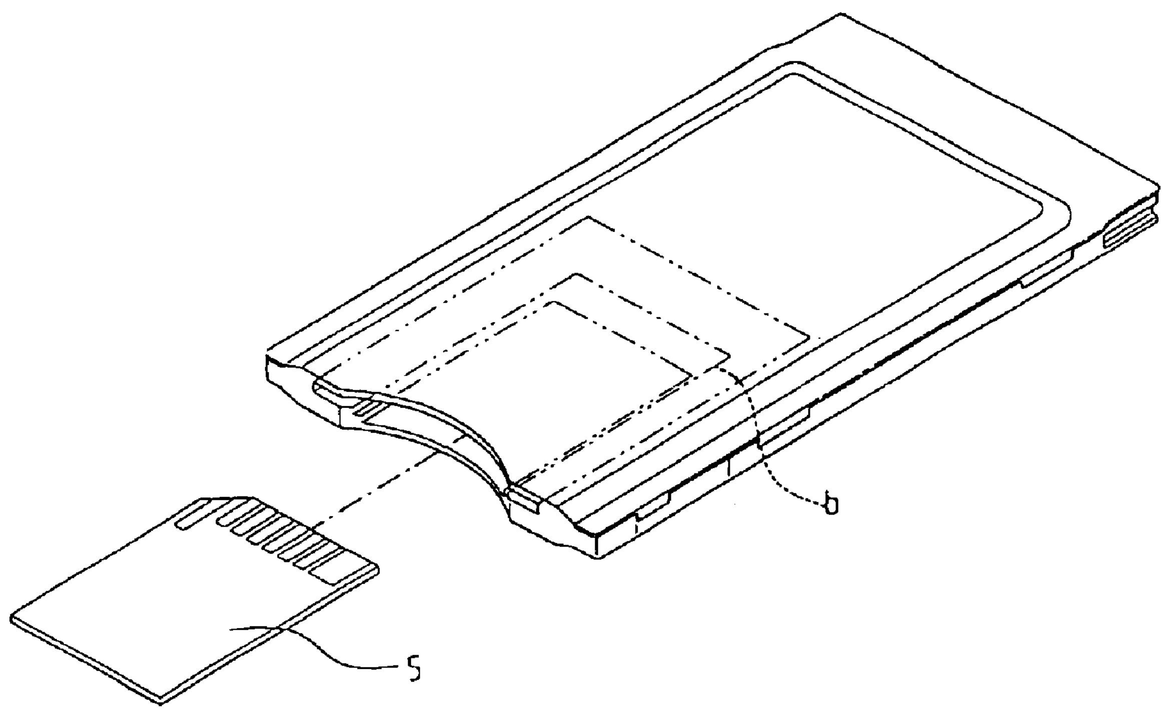
FIG. 5 is a perspective view of another embodiment of the invention.
Figure 6:
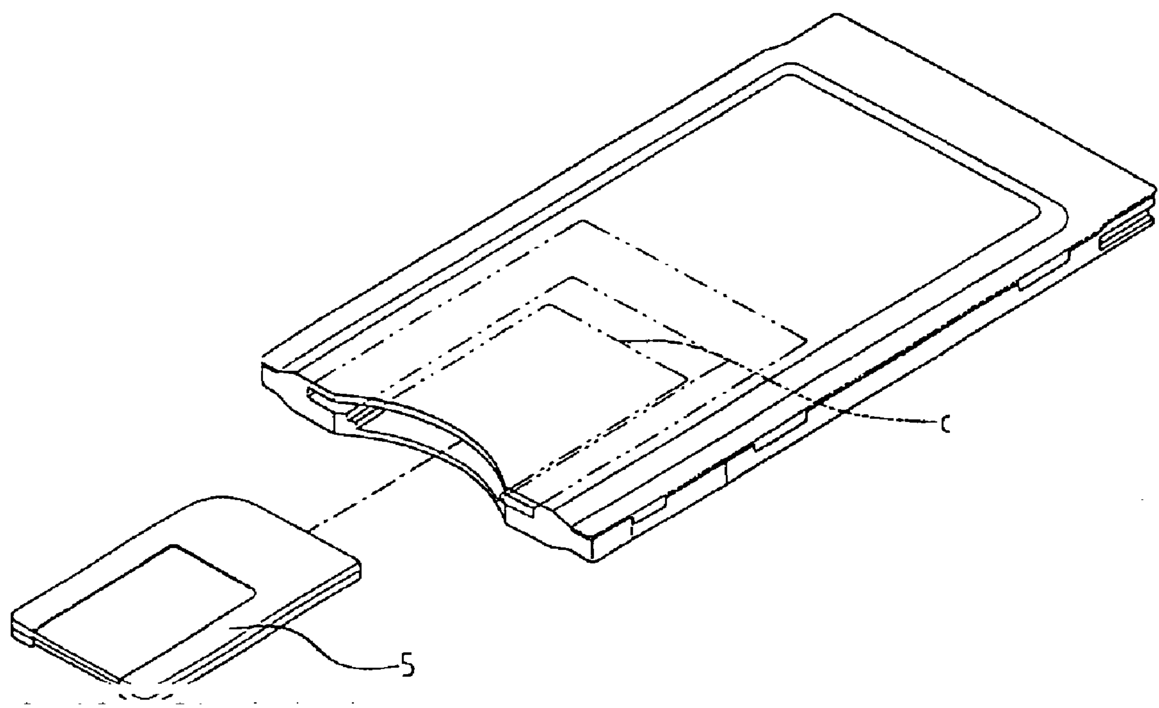
FIG. 6 is a perspective view of a further embodiment of the invention.

Referring to FIGS. 4 to 6, the flash memory card bank can receive Smart Media Cards, Memory Stick Cards, SD Cards, and Multi Media Cards simultaneously with the help of the adapters (21). Furthermore, through changing the layout of the sockets (211) on the adaptors, the space occupied by slots (a), (b), and (c) can be minimized, while the card bank supports 2 or 3 types of flash memory cards simultaneously.

While the invention has been described with referencing to a preferred embodiment thereof, it is to be understood that modifications or variations may be easily made without departing from the spirit of this invention, which is defined by the appended claims.

What is claimed is:

1. A universal flash memory card bank structure, comprising:

an adapter bank, being composed of an adapter and a base plate, the adapter being mounted at a front end of the base plate, a plurality of blocks being respectively formed at two opposite longitudinal sides of the adapter bank, the adapter having a top seat and a bottom seat between which a socket locates for receiving different types of memory cards, and pins being protruded respectively at the top seat and the bottom seat of the adapter in a face-to-face manner;

a chassis, being a shape of frame, having a plurality of grooves and a hole, wherein the grooves are formed at two opposite inner sides thereof to engaging with the chassis by engaging the blocks of the adapter bank with the grooves of the chassis, and the hole is formed through a front end of the chassis to correspond to the socket of the adapter;

a top plate, being fixedly attached to of both the adapter bank and the chassis and having an adhesive plate and an insulation plate at a bottom side thereof; and a bottom plate, being fixed to the adapter bank and the chassis at a respective lower side thereof, an adhesive plate and an insulation plate being further attached at the bottom side of the top plate.

2. The universal flash memory card bank structure as defined in claim 1, wherein the adapter is further formed with terminals for electrically connecting to the base plate.

3. The universal flash memory card bank structure as defined in claim 1, wherein both the top insulation plate and the bottom insulation plate are applied at the center of the top plate and the bottom plate or at the outskirt of the top seat and the bottom seat.

4. The universal flash memory card bank structure as defined in claim 1, wherein the memory cards that can be accommodated in the adapter include Smart Media Card, Multi Media Card, SD Card and Memory Stick Card.

5. The universal flash memory card bank structure as defined in claim 1, wherein the socket further has a plurality of slots for different types of flash memory cards.

6. The universal memory card bank as defined in claim 1, further comprising a fastener formed at an inner front end of the chassis to connect to the adapter bank.

7. A flash memory card bank, comprising:

an adapter bank having a base plate, an adapter mounted to a front end of the base plate, a rear adapter mounted to a rear end of the base plate, wherein the adapter having a top seat and a bottom seat between which a socket locates for receiving different types of memory cards, pins being protruded respectively at the top seat and the bottom seat of the adapter toward the socket;

a chassis, on which the adaptor bank is mounted, wherein the chassis has a hole formed through a front end thereof to align with the socket of the adapter;

a top plate, attached onto a top of the adapter bank and the chassis; and a bottom plate, attached onto a bottom of the adapter bank and the chassis, wherein a top insulation plate and a bottom insulation plate are applied respectively at a center of the top plate and the bottom plate, or at an outskirt of the top seat and the bottom seat.

8. The flash memory card bank structure as defined in claim 7, wherein the top seat and bottom seat are further formed with terminals for electrically connecting to the base plate.

* * * * *